United States Patent
Barbour et al.

[11] Patent Number: 5,857,106
[45] Date of Patent: Jan. 5, 1999

[54] RUNTIME PROCESSOR DETECTION AND INSTALLATION OF HIGHLY TUNED PROCESSOR SPECIFIC ROUTINES

[75] Inventors: Anthony L. Barbour, Windsor; Bruce E. Blaho, Fort Collins, both of Colo.

[73] Assignee: Hewlett-Packard Company, Palo Alto, Calif.

[21] Appl. No.: 656,160

[22] Filed: May 31, 1996

[51] Int. Cl.⁶ .................................................. G06F 9/445
[52] U.S. Cl. ............................................................. 395/709
[58] Field of Search .............................................. 395/709

[56] References Cited

U.S. PATENT DOCUMENTS

| | | | |
|---|---|---|---|
| 4,562,535 | 12/1985 | Vincent et al. | 395/284 |
| 5,269,021 | 12/1993 | Denio et al. | 395/712 |
| 5,410,703 | 4/1995 | Nilsson et al. | 395/712 |
| 5,442,790 | 8/1995 | Nosenchuck | 395/709 |
| 5,493,675 | 2/1996 | Faiman, Jr. et al. | 395/709 |
| 5,594,899 | 1/1997 | Knudsen et al. | 707/2 |
| 5,634,058 | 5/1997 | Allen et al. | 395/712 |
| 5,659,753 | 8/1997 | Murphy et al. | 395/705 |
| 5,678,032 | 10/1997 | Woods et al. | 395/500 |
| 5,680,619 | 10/1997 | Gudmundson et al. | 395/701 |
| 5,682,535 | 10/1997 | Knudsen | 395/701 |

*Primary Examiner*—James P. Trammell
*Assistant Examiner*—John Q. Chavis

[57] ABSTRACT

In a software library which is made up of a series of modules, both generic modules, and substitute modules are provided. While there need not be a substitute for each of the generic modules, when a substitute module is provided, it is optimized for a particular processor or architecture with which the library is expected to be used. Accordingly, when the processor or architecture is identified when the library is first initialized, the generic modules are replaced by the optimized modules, if any, which are available for use with the identified processor or architecture.

6 Claims, 4 Drawing Sheets

RUNTIME PROCESSOR DETECTION AND INSTALLATION OF HIGHLY TUNED PROCESSOR SPECIFIC ROUTINES

BACKGROUND OF THE INVENTION

The present invention relates to computer systems. In particular, the invention relates to a novel approach for implementing computer systems which include software libraries which are dynamically optimized for the particular hardware and/or architecture on which they are running.

When certain types of libraries of computer software are implemented, consideration is often given to optimizing various modules whose performance has a significant impact on the operation of the system which is to use the library. Optimization techniques heretofore known generally take into account the particular hardware or architecture on which the software is expected to run. Unfortunately, as changes are made to computer hardware, software libraries which were optimized for one hardware configuration or architecture are no longer optimized for the new hardware configuration. Alternatively, if a software library is developed with the knowledge that it is to be used on a number of different systems, it can be configured to have either generic modules which will work with any processor or computer architecture, or it may have a single, complicated module which can handle any condition which is expected to be encountered.

A problem with generic modules is that they cannot be optimized for each individual processor configuration, and a problem with the more complicated modules is that in order for them to be able to handle the specific conditions which they encounter they must contain numerous conditional checks, which themselves, slow down the overall system performance each time the module runs. Another problem with the single, complicated module approach is that in some cases such modules are not even technically possible. For instance, compiled (non-assembly) code must be targeted for a particular machine architecture, and it is not possible to get the compiler to generate mixed architecture modules.

Accordingly, in order to optimize software libraries without the problem of having a complicated module with numerous conditional checks, one approach which has been used heretofore was to provide both generic modules, which would work with any processor or architecture under all conditions, and to provide higher performance modules which would only work under certain, specific conditions.

Notwithstanding the higher performance achieved by the latter approach, it only improves system performance under those specific conditions contemplated by the high performance modules. It does not optimize the overall performance of the system for specific processors or architectures.

SUMMARY OF THE INVENTION

In accordance with the preferred embodiment of the invention, a software library is comprised of a series of generic software modules. In addition to the generic software modules, the library also contains optimized software modules which have been specifically implemented to provide optimized performance for a specific processor or for a particular hardware architecture. If the library is used with a processor or architecture for which an optimized software module is available, that optimized module will be used instead of the generic software module when the library is called.

In the preferred embodiment of the invention, predetermined sets of software modules are defined for specific processors and/or hardware architectures. Upon initialization of the library, a determination is made as to whether or not a table containing a set of modules for the particular processor and/or hardware architecture is available. If so, the specific, optimized modules listed in the table are selected for use. Otherwise, the generic modules are used.

In an alternative embodiment of the invention, a number of software modules are available. These modules include both a full set of generic modules, and a set of optimized modules. Each of the optimized modules is identified as being the optimal module for use when the library is operating on a list of processors and/or hardware architectures associated with that module. Upon initialization of the library, the processor and/or hardware architecture is identified, and then the appropriate set of modules to be used is determined by an iterative process.

DETAILED DESCRIPTION OF THE PREFERRED EMBODIMENT OF THE INVENTION

Figure 1:
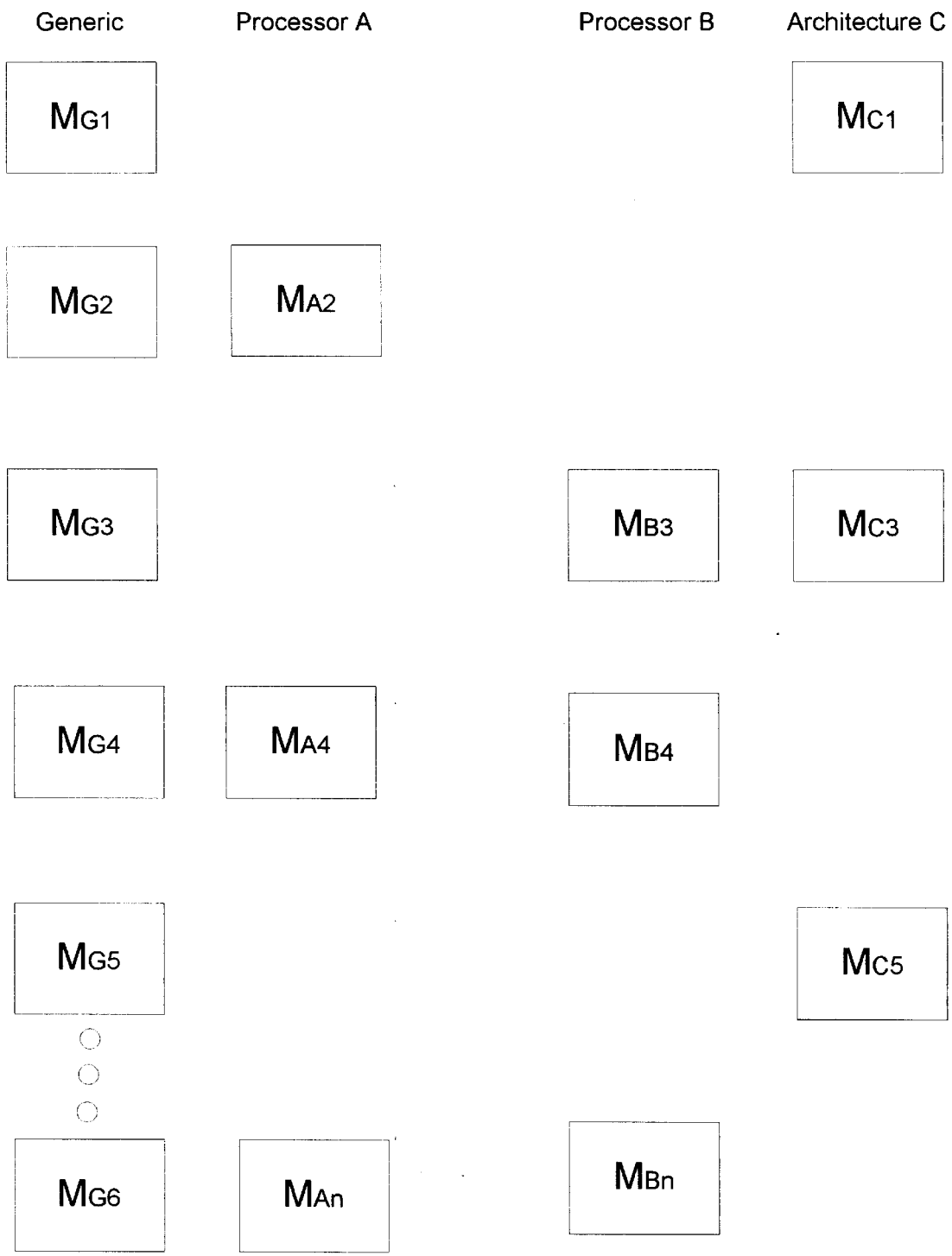
FIG. 1 is an illustration of the library in accordance with the preferred embodiment of the invention which contains both generic, and processor/architecture specific modules.

Referring to FIG. 1, in accordance with the present invention, a software library is comprised of a series of generic modules, $M_{G1}$, $M_{G2}$, $M_{G3}$, $M_{G4}$, $M_{G5}$, ... $MG_{Gn}$. The generic modules, which comprise a complete set of operational modules for the library, are written to work with any processor or architecture with which the library will be used. On the other hand, by writing specific ones of the modules to be optimized for specific processors (or hardware architectures) with which the software library may be used, it may be possible to provide a system which is unique to a variety of different processor/hardware configurations, and which provides significantly enhanced performance with those configurations.

As it has been found that different processors, or different hardware architectures, often benefit from the optimization of different ones of the modules, and as a module which has been optimized for one processor (or architecture) might not work, or might not be efficient, with a different processor (or architecture), the library of the preferred embodiment of the present invention has different sets of optimized software modules for different ones of the processors or architectures with which it may be used.

With continued reference to FIG. 1, the generic modules, $M_{G1}$, $M_{G2}$, $M_3$, $M_{G4}$, $M_{G5}$, ... , $M_{Gn}$, comprise a complete set of operational modules for the library. However, if a first particular processor, Processor A, is used, it may be determined that by rewriting and replacing certain, specific modules, i.e., replacing module $M_2$ with module $M_{A2}$, module $M_4$ with module $M_{A4}$, and module $M_{Gn}$ with module $M_{An}$, the overall system performance would be optimized. Similarly, if a different processor, Processor B, is used,, it may be determined that by rewriting and replacing other specific modules, i.e., replacing module $M_{G3}$ with module $M_{B3}$, module $M_4$ with module $M_{B4}$, and module $M_{Gn}$ with module $M_{Bn}$, the overall system performance would be optimized. Finally, if a different system architecture, Architecture C, is used, ,it may be determined that by rewriting and replacing yet another set of modules, i.e., replacing module $M_{G1}$ with module $M_{C1}$, module $M_3$ with module $M_{C3}$, and module $M_{G5}$ with module $M_{C5}$, the overall system performance would be optimized.

Thus, while the generic modules are always available and could always be used, different sets of optimized modules could be used to replace different ones of the generic modules for specific processor/architecture configurations, as disclosed. The identification of the specific modules which are used to replace certain ones of the generic modules, depending upon the processor/architecture which is present upon the initialization of the library, is set forth in tables. The tables are either present (meaning that there is a specific set of optimized modules available to replace some or all of the generic modules) or not (meaning that the generic modules will be used). Thus, as illustrated in FIG. 1, tables will be present, and specific modules will be used, if Processor A, Processor B, or Architecture C are discovered upon initialization of the library.

Figure 2:
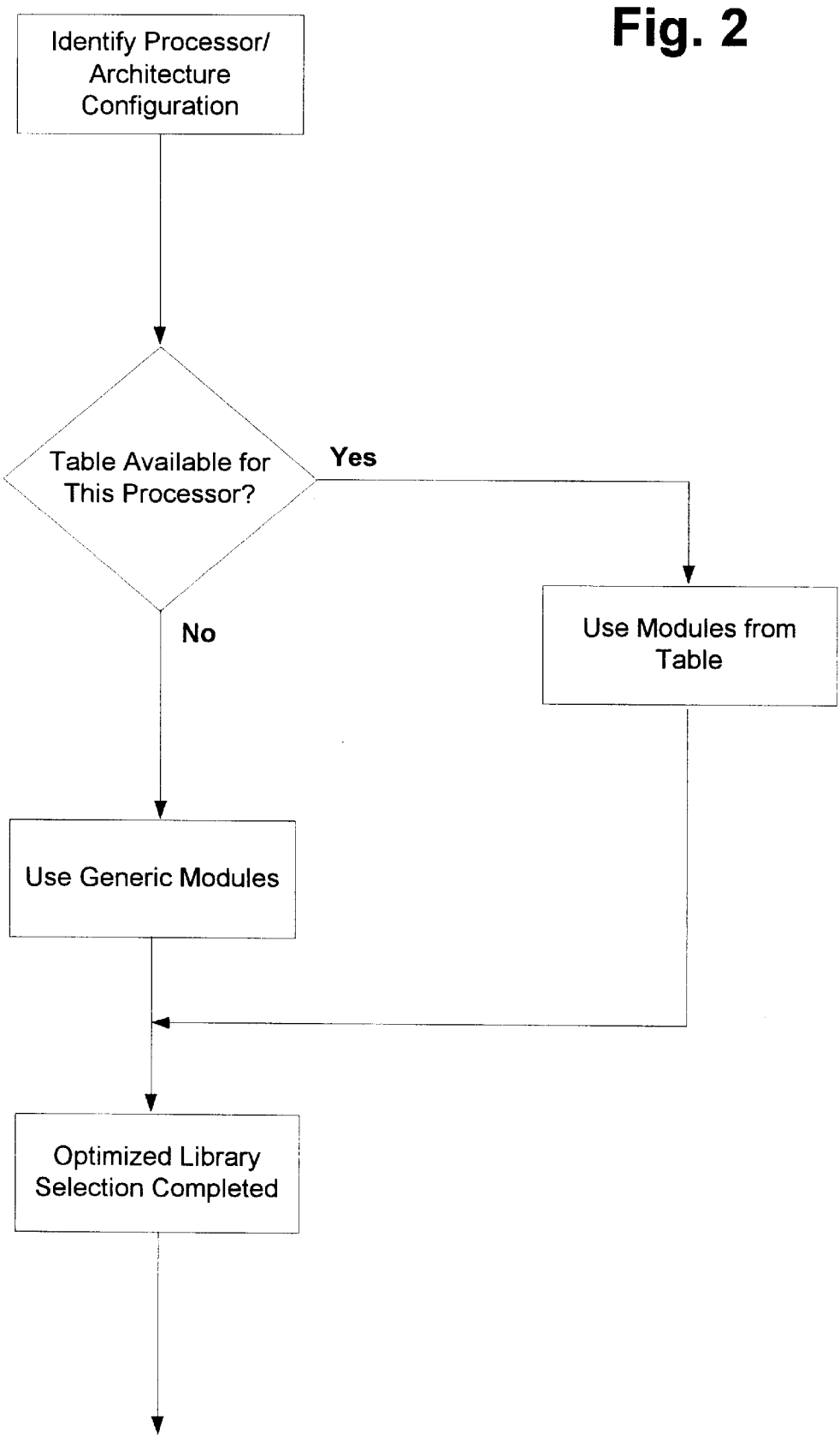
FIG. 2 is a flow chart illustrating the manner in which a particular set of modules is selected for use when the library is first initialized in accordance with the preferred embodiment of the invention.

Referring to FIG. 2, the procedure for selecting modules is set forth in a flow chart. At the time that the library is first initialized, the identity of the processor/architecture on which the library is running, is determined. Then, if there is a specific table available for the processor/architecture encountered, the modules identified in that table will be used. Alternatively, if there is no is specific table available for that processor/architecture, the generic modules will be used Thus, by using a single test prior to using the library, an optimized library for the identified processor/architecture is selected for use.

The present invention uses an indirect calling mechanism which enables the implementation of the processor/architecture specific module scheme discussed herein. At compile time, most conventional libraries link in routines which will be called when each of the library routines are called. This means that unless the application is recompiled, there is one, and only one, routine that will be called when a library call is made. The libraries of the present invention use macros and indirect procedure pointers which let the control code in the library dynamically change which routine is called, as the application runs, without need to recompile.

As mentioned above, the common way to deal with getting performance on more than one architecture/processor was to either ship one generic library which is optimized for at most one architecture, or to ship multiple versions of the library, one for each architecture. This implies that each library shipped must be tested, defects must be fixed in each version, and modifications or enhancements must be made in each version. Our indirect procedure pointer approach allows us to tune modules in which architecture/processor tuning makes a difference, while allowing us to ship/test/develop/maintain only one library.

Figure 3:
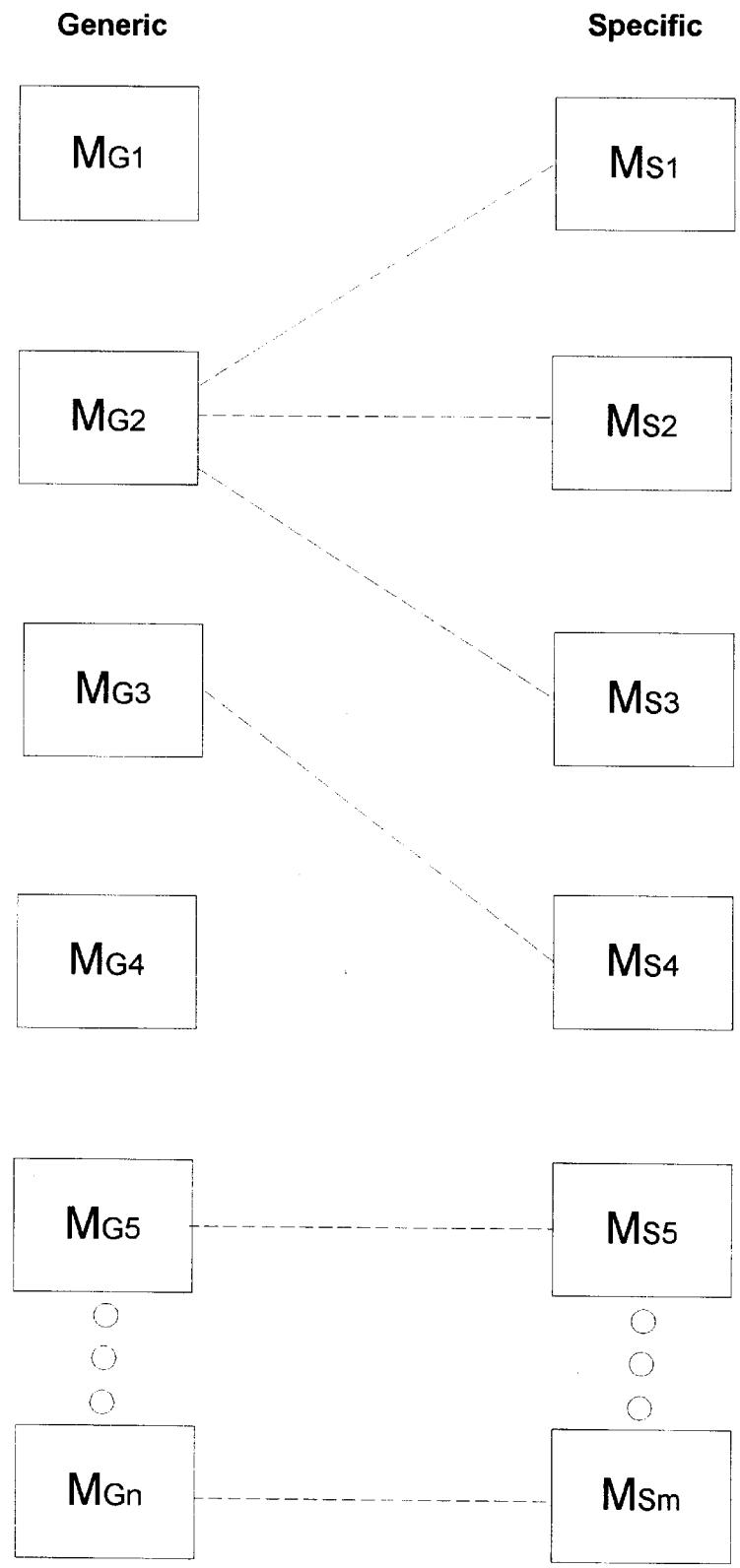
FIG. 3 is an illustration of a library in accordance with an alternative embodiment of the invention which contains both generic, and processor/architecture specific modules.

With reference now to FIG. 3, an alternative embodiment of the present invention is described. In this embodiment, there are a series of generic modules, $M_{G1}$, $M_{G2}$, $M_{G3}$, $M_{G4}$, $M_{G5}$, ..., $M_{Gn}$, which comprise a complete set of modules needed by the library. In addition to the generic modules, $M_{G1}$, $M_{G2}$, $M_{G3}$, $M_{G4}$, $M_{G5}$, ..., $M_{Gn}$ the library includes a series of specific, optimized modules, $M_{S1}$, $M_{S2}$, $M_{S3}$, $M_{S4}$, $M_{S5}$. ..., $M_{Sm}$. Each of the optimized modules can be used instead of the generic modules with one, or (possibly) more, specific processors/architectures. Upon initialization of the library, the specific processor/architecture in use is determined, as illustrated by the flow chart in FIG. 4. Then, using an iterative process, an optimized set of modules is selected for use with the processor/architecture which was identified.

Figure 4:
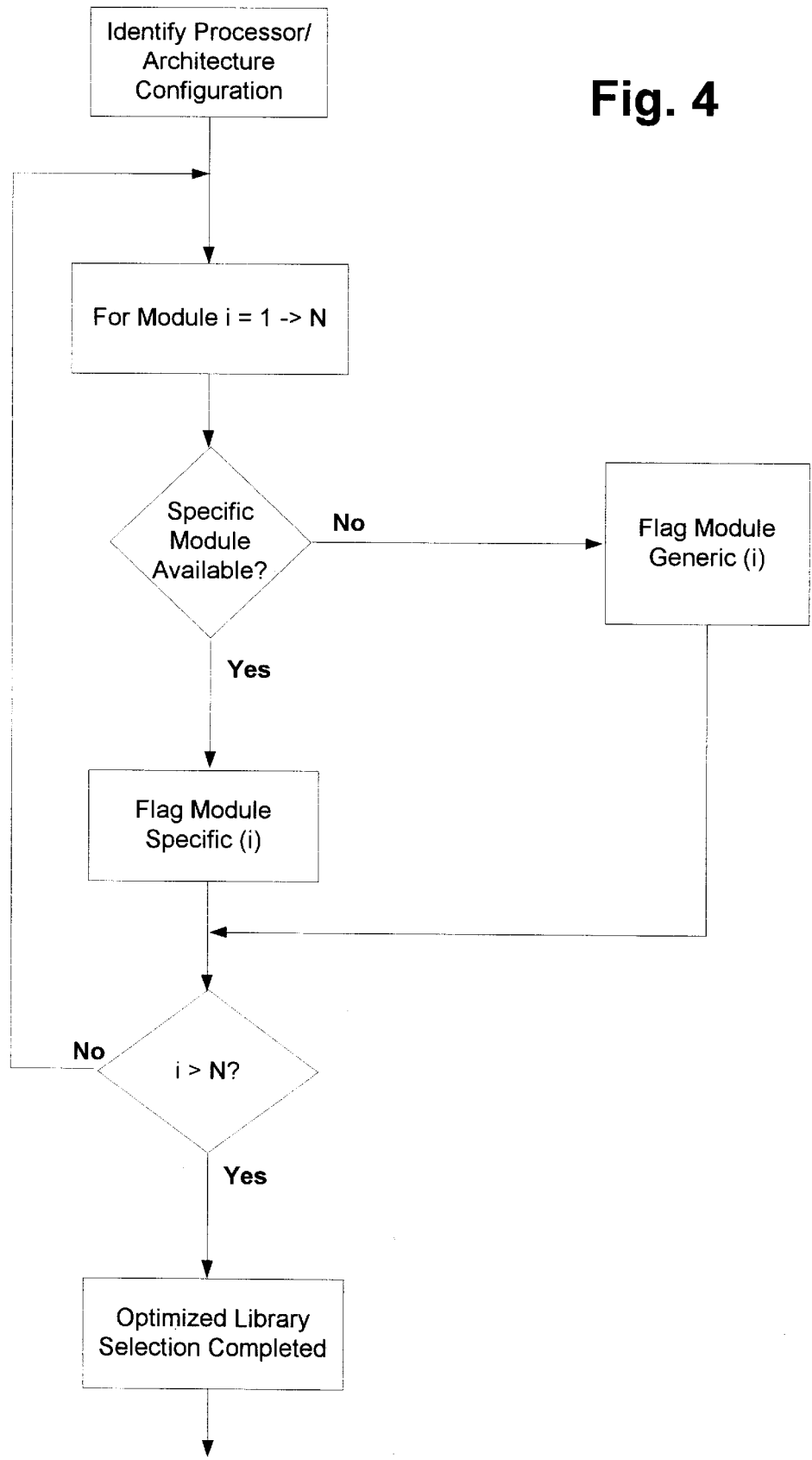
FIG. 4 is a flow chart illustrating the manner in which a particular set of modules is selected for use when the library is first initialized in the alternative embodiment of the invention.

As illustrated in FIGS. 3 and 4, the procedure for selecting modules is accomplished by determining the identity of the processor/architecture on which the library is running when the library is first initialized. Then for each of the i modules in the library a determination as to whether or not there is a specific module available for use with that processor/architecture. If so, it is flagged for use. If not, the generic module is flagged. At the end of this process, an optimized library for the identified processor/architecture has been determined, which consists of the flagged modules, and that is the library which will be used.

As illustrated in FIG. 3, there may be no specific modules available to replace some of the generic modules. Thus, there is no specific module available to replace $M_{G1}$. On the other hand, there may be one or several specific modules (See modules $M_{S1}$, $M_{S2}$, $M_{S3}$, which are available depending upon processor/architecture encountered, to replace a particular one, $M_{3,}$ of the generic modules; or $M_{S4}$ to replace $M_{S3}$; or $M_{S5}$ to replace $M_{S5}$.) available to replace a generic module.

Unlike the optimized modules of the prior art, which were intended to replace generic modules whenever certain conditions were encountered, irrespective of the processor or architecture in use, the optimized modules of the present invention are specifically designed for use with a particular processor or architecture. As illustrated, they are intended to be used in lieu of the generic software modules whenever the library is used with a processor or architecture for which the modules have been implemented. Also, as illustrated, once the library has been initialized, there is no further need to make any other determinations while the optimized library is in use.

Thus, in accordance with the present invention an optimized set of modules is selected when the library is initialized, and the optimized set of modules is used by the system. Notwithstanding the desire to optimize the library, it has been found that it is generally not necessary for every module within the library to include a set of optimized substitute modules for every possible processor or architecture. Instead, it has been found to be important to have such optimized substitute modules available for those functions which are performance critical to the overall system. The optimized modules are selected once, and no further checks are necessary in order to provide optimal system performance.

By way of example, the present invention has been used successfully where a software library had been developed for use with a particular processor having a floating point instruction called FMPYADD (standing for Floating point MultiPlY and ADD). The FMPYADD instruction, which was specific to that processor, performs both multiply and add operations at the same time, and in less time than it would take to do a multiply operation and then an add operation.

When the original processor was replaced by a newer, different processor, it was discovered that while the newer processor also implemented the FMPYADD instruction, it did not perform both the multiply and the add operations at the same time. In fact, it was discovered that the FMPYADD instruction on the newer processor took even longer to perform than simply doing a multiply operation and then following it with a subsequent add operation. Consequently, the performance of the software on the newer processor was initially disappointing.

The newer processor did, however, provide an alternative instruction for performing floating point math operations. One new instruction included in the instruction set of the new processor, called FMPYFADD, allowed the multiplication of two numbers and the addition of a third number to the result of the multiply operation. It performed the FMPYFADD operation in less time than the multiply operation followed by the add operation. Accordingly, it was discovered that a module which formerly used the FMPYADD instruction could be rewritten to use, instead, the FMPYFADD instruction, and that it would then provide satisfactory performance levels.

Accordingly, in a library in accordance with the present invention, one module (using the FMPYADD instruction) is provided for use on the older processor, and it runs fine on those processors. However, it does not provide satisfactory performance on newer processors. On the other hand, an alternative module (using the FMPYFADD instruction) was developed for use on the newer processors, and it provides satisfactory performance on those newer processors.

We claim:

1. An improved software library comprising:
   (a) at least one generic module which can operate with any processor or hardware architecture;
   (b) at least one optimized module which has been optimized for a particular processor, or hardware architecture, said at least one optimized module being adapted to replace said at least one generic module;
   (c) initialization means for initializing said software library, said initialization means being able to identify the processor, or hardware architecture, on which the library is running, and to dynamically select a set of modules which are optimized for the particular processor, or hardware architecture, which has been previously identified as being an optimized selection for use with said identified processor, or hardware architecture.

2. The improved software library of claim 1, wherein said library includes at least one table which defines a set of software modules which should be used if a particular processor, or hardware architecture, specific to said at least one table, is identified as the particular processor, or hardware architecture, in use when said library is initialized.

3. The improved software library of claim 2, wherein said library includes a plurality of specific modules, each of said specific modules being associated with a specific table, each of said specific tables being associated with a particular processor or hardware architecture.

4. The improved software library of claim 1, wherein each of said at least one optimized module is has been optimized for at least one particular processor, or hardware architecture, and wherein said initialization means selects a set of modules which are optimized for the particular processor, or hardware, which was identified by using an iterative procedure.

5. A method for selecting an improved software library comprising:
   (a) providing at least one generic module which can operate with any processor or hardware architecture;
   (b) providing at least one optimized module which has been optimized for a particular processor, or hardware architecture, said at least one optimized module being adapted to replace said at least one generic module;
   (c) initializing said software library, and identifying the processor, or hardware architecture, on which the library is running; and
   (d) determining whether the library contains a table of modules which has been optimized for the particular processor, or hardware architecture, which has been previously identified; and
   (e) selecting for use the modules which are included in any table of modules which is contained within said library and which has been identified as being optimized for use with said identified processor, or hardware architecture.

6. A method for selecting an improved software library comprising:
   (a) providing at least one generic module which can operate with any processor or hardware architecture;
   (b) providing at least one optimized module which has been optimized for a particular processor, or hardware architecture, said at least one optimized module being adapted to replace said at least one generic module;
   (c) initializing said software library, and identifying the processor, or hardware architecture, on which the library is running; and
   (d) iteratively determining whether the each of said generic modules can be replaced by an optimized module, whereby a set of optimized modules is selected for use with the particular processor, or hardware architecture, which was identified.

* * * * *